March 30, 1954  W. B. EDDISON  2,673,674
MACHINE FOR APPLYING SEALING BANDS TO BOTTLES
Filed Sept. 26, 1950  6 Sheets-Sheet 1

INVENTOR
W. Barton Eddison
BY
Andrus & Sceales
ATTORNEYS.

March 30, 1954  W. B. EDDISON  2,673,674
MACHINE FOR APPLYING SEALING BANDS TO BOTTLES
Filed Sept. 26, 1950  6 Sheets-Sheet 2

FIG.3.

INVENTOR
W. Barton Eddison
BY
ATTORNEYS.

March 30, 1954  W. B. EDDISON  2,673,674
MACHINE FOR APPLYING SEALING BANDS TO BOTTLES
Filed Sept. 26, 1950  6 Sheets-Sheet 5

INVENTOR
W. Barton Eddison
BY
ATTORNEYS.

March 30, 1954  W. B. EDDISON  2,673,674
MACHINE FOR APPLYING SEALING BANDS TO BOTTLES
Filed Sept. 26, 1950  6 Sheets-Sheet 6

INVENTOR
W. Barton Eddison
BY
ATTORNEYS.

Patented Mar. 30, 1954

2,673,674

UNITED STATES PATENT OFFICE 2,673,674

MACHINE FOR APPLYING SEALING BANDS TO BOTTLES

William Barton Eddison, Irvington, N. Y., assignor to Gisholt Machine Company, Madison, Wis., a corporation of Wisconsin Application September 26, 1950, Serial No. 186,691

5 Claims. (Cl. 226—80)

This invention relates to an improvement in machines for applying sealing bands to bottles and the like.

Such machines are particularly adapted to the application of bands of wet regenerated cellulose and the like, which shrink rapidly upon drying and fit tightly upon the surface to which they are applied, such as the necks and caps of bottles.

An object of the invention is to provide a machine having a simple and effective mechanical means for opening the sealing bands successively.

Another object is to provide a machine having a simple and effective mechanism for picking up and rapidly transferring the open sealing band to a loading mechanism in the machine.

Another object is to more effectively break the vacuum and adhesive forces between the tightly engaged inner faces of the bands and to facilitate further opening of the same for transfer through the machine.

Other objects and advantages of the invention are set forth hereinafter in the description of an embodiment of the invention illustrated in the accompanying drawings.

The machine is made up of a plurality of parts operated in synchronism to strip successive bands from a magazine, open the same, pick them up individually and transfer them to loading fingers, expand the loading fingers to shape the respective bands, translate the bands from a horizontal transporting position to a vertical position over a bottle top, and drop the bands onto the bottles, one by one. The parts are all operated from a single source of power in rapid time cycle whereby each separate movement constitutes only a small part of the total time of applying a single band, and while one band is being dropped on a bottle another is being opened and picked up, and while one is being transferred to the loading fingers another is being stripped from the magazine.

The seal bands 1 of regenerated cellulose or other wet material adapted to shrink upon drying, are tubular and are folded flat and received in cans of glycerin solution or other preservative liquid or in sealed packs. When removed from the liquid or pack they quickly dry and shrink. When applied to a bottle top 2, as shown, the band shrinks to the shape of the corresponding top and seals the cap 3 in place so that the latter cannot be removed without first breaking the dry seal band.

The machine illustrated herein for applying the sealing bands in succession to bottle tops comprises in general, a magazine 4 containing a stack of flat folded bands 1, a stripper mechanism 5 having a plate disposed beneath the stack and adapted to strip a single seal at a time laterally from the bottom thereof, opening mechanism 6 having an opening finger disposed above the stripped seal on the plate of mechanism 5 and adapted to engage the upper surface of the seal frictionally to move the upper wall of the seal relative to the lower wall and effect a partial opening of the seal adjacent each folded edge, a pick-up and transfer mechanism 7 having a pair of pick-up fingers mounted on a carriage for entering the partially open seal and separating laterally to lift the seal from the stripper plate and then being adapted to move backwardly to transfer the seal to a loading head 8 which has a plurality of contractable and expansible fingers adapted to receive the seal from the pick-up fingers and to expand the same to substantially cylindrical shape and then to translate the same to a vertical position for applying to a bottle top 2, and a stripper mechanism 9 carried by the loading head and adapted to strip the seal downwardly from the fingers and onto the bottle top.

The machine embodies a drive for the several groups of mechanism above referred to in synchronism whereby a rapid succession of seals may be applied automatically to a corresponding succession of bottles.

The machine has a table top base 10 upon which all of the operative elements are supported to be driven in correlation by a pair of cam shafts 11 and 12, respectively.

Cam shaft 11 extends along the rear end of the machine and has a main drive pulley 13 at one end connected by a belt 14 to a suitable drive disposed beneath the table and comprising an electric motor 15 and a suitable speed reducer unit 16. A clutch 17 is mounted in the hub of drive pulley 13 and is operated by hand lever 18 to start and stop the machine. Any suitable drive and control may be employed as desired.

Cam shaft 12 extends along the front end of the machine and may be driven in synchronism with shaft 11 by a chain 19 and a suitable sprocket 20 on shaft 11 and a corresponding sprocket 21 on shaft 12. The several operative mechanisms of the machine are disposed adjacent the cam shafts 11 and 12 to be driven thereby in synchronism.

In the machine illustrated the several mechanisms are disposed between the cam shafts 11 and 12 on table top 10. The stripper 5, opening mechanism 6 and the pick-up and transfer mechanism 7 are driven from cam shaft 11, and the loading head 8 with its fingers, and stripper 9 are driven from cam shaft 12.

The magazine 4 comprises a vertically disposed container having adjustable side walls 22. A weight 23 is disposed to weight down the seals which lie one on top of another upon their flat sides to form a stack 24 in the container. The seals 1 are introduced in the container of magazine 4 by hand from the top and are removed from the bottom of the stack 24 in the container one by one by the stripper mechanism 5.

The stripper mechanism 5 comprises a plate 25 constituting the bottom support for the stack 24 of seals in the magazine and which is movable horizontally in a reciprocating path in its own plane under the influence of a cam 26 on shaft 11. Cam 26 drives plate 25 by means of a cam follower 27 on the plate, and a spring 28 disposed beneath the plate biases the same in a direction to effect continued engagement of follower 27 with its cam 26.

The plate 25 has longitudinal tongues 29 along its side edges and is disposed to ride in a complementary channel 30 in its support 31 on base 10. The plate 25 also has a stepped upper surface presenting a transverse shoulder 32 of a height suitable for engaging the end edge of a flat folded seal 1 at the bottom of stack 24 and stripping the seal from the stack when the plate is moved forward beneath the stack. After removal of the stripped seal from the plate 25 the latter returns and shoulder 32 passes from beneath the stack 24 and permits the latter to drop for the height of the shoulder so that the next lowermost seal in the stack is ready for the next stripping movement.

The front and rear walls 22 of the magazine should have their bottom edges register with the top of step shoulder 32 so that the latter may pass freely therebeneath. The front wall 22 of the magazine should be spaced above the lower level of plate 25 a distance sufficient to accommodate the thickest seal therebetween during stripping.

The plate 25 is held down upon the support 31 by means of removable hold-down strips 33 secured to the support and overlapping the tongues 29 of plate 25.

The upper surface of the lower level of plate 25, which receives and carries the seal during stripping, preferably has a friction rubber insert 34 therein adapted to engage and support the seal against lateral thrust during stripping and initial opening.

During the time that the stripped seal is held by a dwell in cam 26 forward of the stack in what may be called the opening and pick-up position, the seal is first partially opened by the mechanism 6 and then picked up by the mechanism 7.

The mechanism 6 comprises a vertically reciprocable post 35 mounted in a lug 36 on the side of support 31. The upper end of post 35 is bifurcated to provide a transverse slot 37 therein for receiving the upper end of an opener finger 38 which is pivotally carried by the post by means of the cross pin 39.

The lower end of finger 38 carries a neoprene or other suitable friction tip 40 for engaging with the top surface of a seal 1 at the opener position on plate 25 in front of stack 24. The tip 40 is normally held above and out of interference with the movement of seal 1 during stripping of the same from stack 24, by means of a stop 41 on post 35 which supports the outer end of the finger 38 against pivoting downwardly into the path of movement of the seal.

The post 35 is supported and moved vertically by a horizontal arm of a bell crank lever 42 pivotally carried by a pivot pin 43 extending horizontally from support 31. The lower horizontal arm of lever 42 has its free end bifurcated to form a yoke 44 receiving a pin 45 on the side of the lower end of post 35 to thereby control the vertical position of the post and support the same at all times.

Lever 42 has an upwardly extending arm on the opposite side of pivot 43 from the lower arm and which carries a cam follower 46 adapted to ride upon a cam 47 on shaft 11 and which effects rocking of the bell crank lever 42 to raise and lower post 35 in synchronism with the movement of stripper 5.

Figure 6:
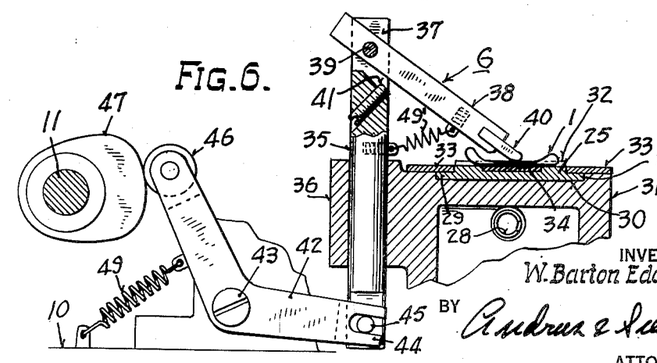
Fig. 6 is a similar section showng the seal open and the finger in the position at the end of its opening stroke.
Figure 7:
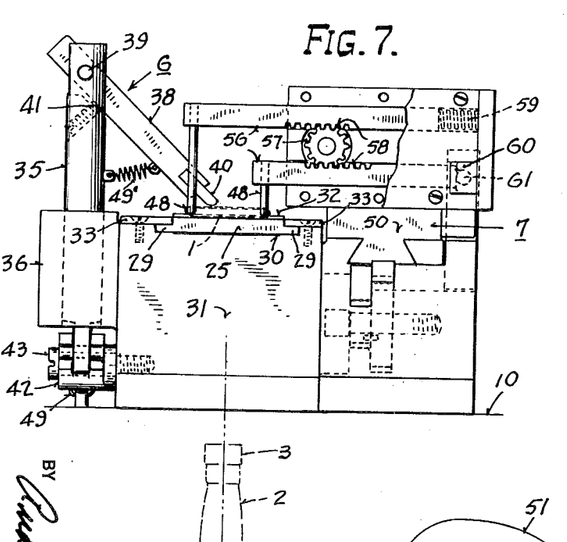
Fig. 7 is a detail vertical front end elevation of the pick-up and transfer finger mechanism taken on line 7—7 of Fig. 3.
Figure 8:
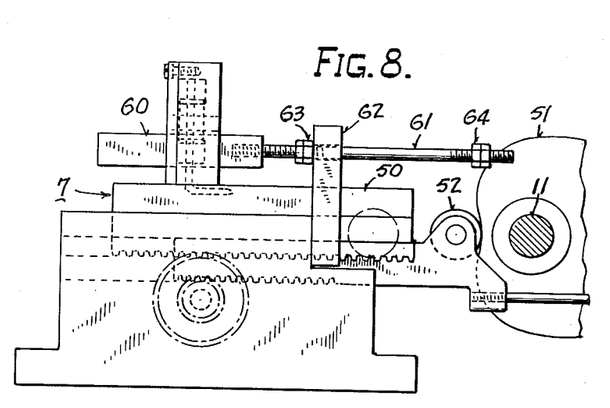
Fig. 8 is a vertical section taken at right angles to Fig. 7 on line 8—8 of Fig. 3.
Figure 9:
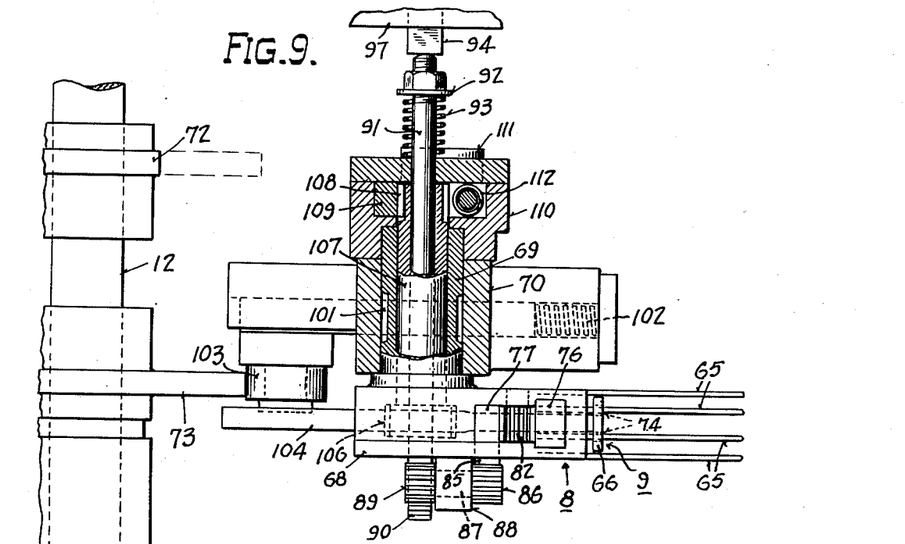
Fig. 9 is a horizontal section taken through the loading mechanism.
Figure 10:
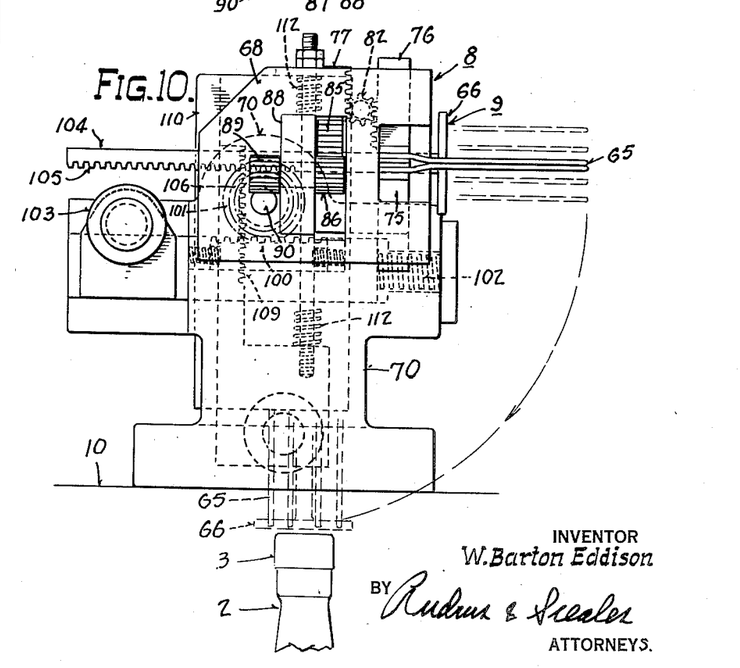
Fig. 10 is a side elevation of the loading mechanism showing additionally in dotted line the position at the time of discharge of a sealing band upon a bottle.
Figure 11:
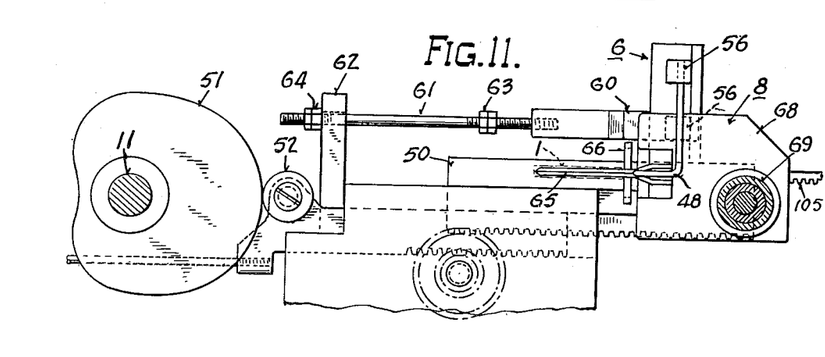
Figure 11 is a side elevation showing the transfer of a seal from the pick-up fingers to the loading fingers.
Figures 12, 13:
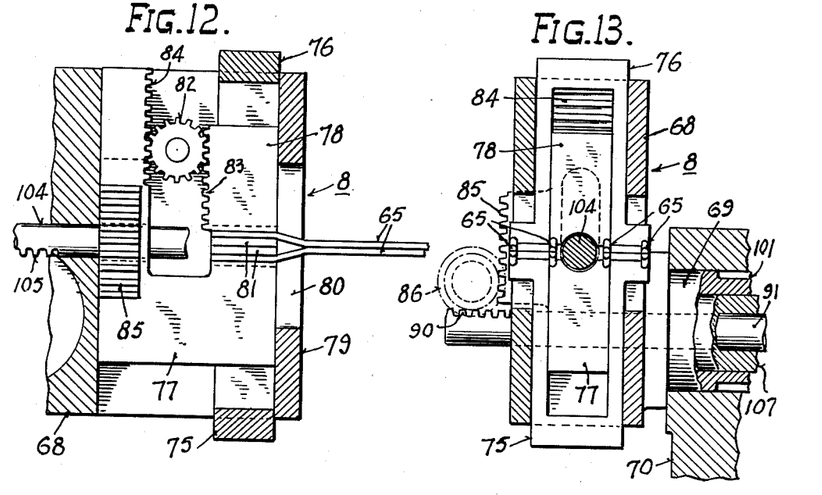
Fig. 12 is an enlarged detail section of the loading head showing the loading fingers closed together and disposed horizontally to receive a band.
Fig. 13 is a detail section taken at right angles to Fig. 12.
Figure 14:
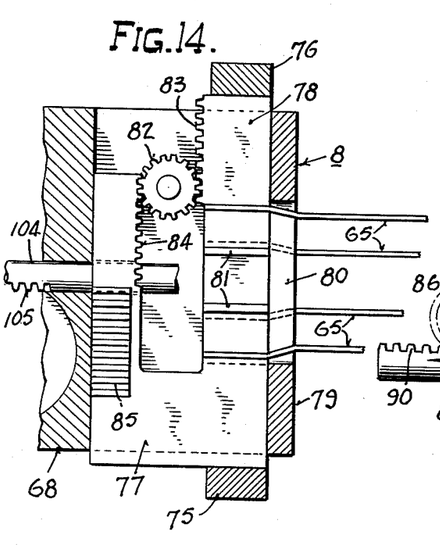
Fig. 14 is a view similar to Fig. 12 showing the loading fingers expanded to hold a band.
Figure 15:
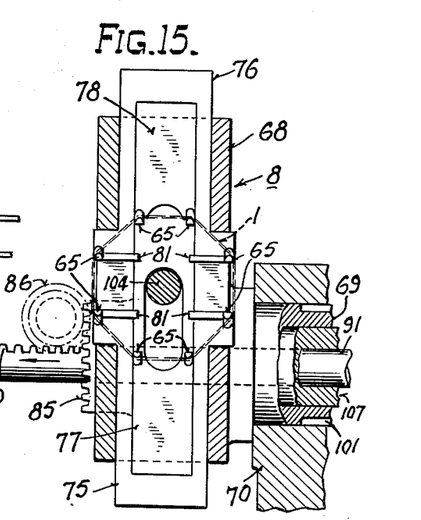
Fig. 15 is a detail section taken at right angles to Fig. 14.

Cam 47 effects a lowering of post 35 during the dwell of cam 26 at the time seal 1 is supported on stripper plate 25 in a position substantially centered beneath the tip 40 of finger 38, so that tip 40 engages the top surface of the seal. As post 35 continues to move downward after initial engagement of the tip 40 with the seal, the finger 38 is compelled to pivot at 39, thereby tending to rotate to a horizontal position whereby tip 40 frictionally slides the upper wall of the seal towards the opposite folded edge. This movement of finger 38 distorts the seal 1 to produce a separation of the walls thereof in front of and behind the tip 40, as shown in Fig. 6, so that the band is opened near its two folded edges to receive a pair of pick-up and transfer fingers 48 operated by the pick-up mechanism 7.

A tension spring 49 disposed between the upwardly extending arm of lever 42 and base 10 biases the lever in a direction to maintain engagement between follower 46 and cam 47 and to maintain post 35 in raised position except when cam 47 forces a movement of lever 42 against the spring.

A tension spring 49' is disposed between finger 38 and post 35 to effect a predetermined frictional engagement of tip 40 with the seal 1 and to bias finger 38 toward its stop 41 at all times. The spring 49' also prevents displacement of finger 38 during rapid operation of the machine from the inertia of the mass movement involved.

As soon as the horizontal pick-up fingers 48 enter the initially opened seal, the cam 47 retracts and permits spring 49' to raise post 35, to thereby raise finger 38 and retract tip 40 upwardly from the seal.

The pick-up and transfer mechanism 7 comprises a main slide 50 adapted to move horizontally at right angles to the movement of tip 40 in initially opening the seal 1. In the machine shown, the plate 25 and slide 50 move parallel in operation while tip 40 moves in a vertical plane at right angles to the plate and slide.

Movement of slide 50 is effected by a large cam 51 on shaft 11 and which is disposed to engage a cam follower 52 on the rear end of the slide. Since the slide 50 reciprocates for a substantial distance, it is biased in a return direction toward cam 51 by means of a cable 53 extending rearwardly from the slide and over a suitable pulley 54 with a weight 55 hanging on the end of the cable.

The slide 50 carries a pair of cross slides 56 which extend horizontally in front of the magazine 4 one above the other and from which the corresponding L-shaped fingers 48 are suspended. The slides 56 are interconnected by means of a gear pinion 57 meshing with opposed racks 58 on the corresponding slides so that the slides move in opposite directions.

The upper slide 56 is biased outwardly in a direction tending to separate the fingers 48 by means of a compression spring 59 engaging the inner end of the slide. The slides 56 are moved in a direction against spring 59 to move fingers 48 toward each other by means of a cam 60 extending longitudinally of main slide 50 and having a cam surface engaging the inner beveled end of the lower slide 56.

Cam 60 reciprocates relative to slide 50 to effect the desired separation and contraction of fingers 48 in synchronism with the movement of the slide. For this purpose the cam has a relatively thin section with parallel sides at one end, a relatively thick section with parallel sides at the other end, and a beveled cam section therebetween. Movement of cam 60 longitudinally of slide 50 determines which end section of the cam is disposed in engagement with the lower slide 56, thereby determining the separation of fingers 48.

The cam 60 is operated automatically by the reciprocation of slide 50, the operation being effected by a rod 61 secured axially to one end of cam 60 and extending parallel to the movement of slide 50. Rod 61 passes loosely through a vertical abutment plate 62 carried by base 10, and the rod carries a pair of stop nuts 63 and 64 adjustably threaded thereon on opposite sides of plate 62.

When slide 50 moves toward cam shaft 11 to cause fingers 48 to enter a sealing band 1 to be picked up, and just before the slide 50 reaches the extreme end of its movement, after initial entry of fingers 48 in the band, stop nut 63 on rod 61 engages plate 62 and stops further movement of cam 60 with slide 50. As slide 50 continues to the end of its stroke, the slide 50 and the lower slide 56 are moved relative to cam 60 to permit the lower slide 56 to move into the recessed thinner end portion of the cam 60, thereby providing for separation of fingers 48 by the biasing movement of spring 59, and resulting in a picking up of the sealing band 1 which is then tightly stretched across the fingers.

The slide 50 is then reversed in direction carrying cam 60 with it until the band 1 is slipped over the ends of the loader fingers 65 on the loading head 8. As slide 50 approaches the end of this stroke and the band 1 engages the stripper plate 66 of mechanism 9 which stops further travel of the band, the outer stop nut 64 on rod 61 engages plate 62 and stops further travel of cam 60. As slide 50 continues to the end of its stroke to release band 1 from fingers 48, slide 50 and the lower slide 56 move relative to cam 60 to push the latter in a direction effecting movement of fingers 48 toward each other and of the upper slide 56 against the biasing spring 59. The fingers 48 then clear the end of the band 1 leaving the latter solely supported by the loader fingers 65.

Before the slide 50 is moved forwardly to pick up another sealing band 1 the loader fingers 65 are expanded by separation to provide a substantially circular shape for the band thereon and the head 8 is rotated to tilt the fingers 65 downwardly and thereby position the band vertically over a bottle top 2 and out of the way of the returning pick-up fingers 48. When fingers 65 have deposited the band 1 upon a bottle top 2 the head is rotated back to position the fingers 65 horizontally and the latter are contracted to position the same for receiving the next succeeding band from fingers 48.

The transfer of band 1 from magazine 4 to loader fingers 65 involves the stripping of the band from the bottom of stack 24 by plate 25 driven by cam 26, initial opening of the band by finger 38 driven by cam 47, the entrance of pick-up fingers 48 into the open end of the band by movement of slide 50 against the receding cam 51, the separation of fingers 48 to pick up the band, the carrying of the band forwardly by fingers 48 as slide 50 is pushed forwardly by cam 51 until the band is disposed upon loading fingers 65, the contracting of fingers 48 and withdrawal of the same from the band as slide 50 continues to the end of its stroke, and the return of the slide 50 and the contracted fingers toward the next band on stripper plate 25 while the loader head 8 is functioning to apply the band to a bottle top 2.

The loader head 8 may have any desired construction, that shown having a detail construction similar to that set forth in the co-pending application of the present applicant and Jack Lee Pomeroy, Serial No. 665,885, filed April 29, 1946, and now issued to Patent No. 2,630,956, and which also discloses an embodiment of the present invention.

There are three basic movements involved in loading: (1) the expansion and contraction of fingers 65 so that the fingers are normally arranged in a common plane when receiving a band 1 from fingers 48 and are expanded to give the band a substantially circular open shape when applying the same to a bottle top 2; (2) the reciprocatory rotation of head 8 to tilt the fingers 65 and band 1 from horizontal to vertical downward position and to return the fingers to horizontal position; and (3) the reciprocation of stripper plate 66 which pushes the band 1 downwardly from fingers 65 onto the bottle top 2 registered therewith.

In operation of the machine a series of bottles are moved successively along a conveyor beneath the table top 10 and a bottle is made to register with fingers 65 each time the latter tilt downwardly to apply a sealing band thereto. An opening 67 through the table top 10 provides for the tilting of fingers 65 downwardly therethrough to register with the successive bottles.

As set forth in said co-pending application the loader 8 comprises a loader block 68 carrying fingers 65 and stripper plate 66 and is secured on the end of a sleeve 69 journaled in and extending through a pedestal 70 fixed on base 10. The axis of sleeve 69 is parallel to shaft 12, and is disposed to provide an axis for rotary movement of block 68 to locate the fingers 65 horizontally at a height to receive a band 1 from fingers 48 and vertically above and in registry with a bottle top 2 for applying the band thereto.

Three cams are mounted on shaft 12 for driving loading head 8 and stripper 9. Cam 71 serves to operate fingers 65; cam 72 serves to reciprocate stripper plate 66; and cam 73 serves to oscillate loader block 68 rotationally.

There are preferably eight fingers 65 in the form of parallel wires arranged in pairs. When block 68 is disposed with the fingers 65 horizontal and ready to receive a sealing band 1 from fingers 48, each pair of fingers has one finger lying above the other. The pairs of fingers 65 are about equally spaced apart laterally so that the outermost pairs are disposed on opposite sides of stripper plate 66 and the innermost pairs extending through corresponding vertical slots 74 in the stripper plate.

The lower fingers 65 of the outer pairs are secured to the top of a lower U-shaped vertical slide 75, and the upper fingers of the same pairs are secured to the bottom of an inverted upper U-shaped vertical slide 76. Said slides 75 and 76 are disposed for corresponding vertical movement in opposite directions so that when the slides are closed together the fingers 65 carried thereby are closed for passage of a band 1 thereover from fingers 48, and when the slides are separated vertically the corresponding fingers 65 are likewise separated vertically to expand the band.

The lower fingers 65 of the inner pairs are secured to the top of a lower inner slide 77 adapted to slide vertically in the lower U-shaped slide 75, and the upper fingers of the same pairs are secured to the bottom of an upper inner slide 78 adapted to slide vertically in the upper U-shaped slide 76. A front plate 79 on block 68 covers the slides 75 to 78 to hold them in place, and has vertical channels 80 therethrough for receiving the corresponding fingers 65 and guiding their movement.

Slides 75 and 76 have flanges 81 extending inwardly from each side and disposed between slides 77 and 78 so that when the latter are closed together they effect closing of slides 75 and 76 upon each other to bring all of the fingers 65 together simultaneously.

Slides 77 and 78 are synchronized in movement by means of a transverse pinion 82 mounted in end bearings in the side walls of block 68 and meshing with a vertical rack 83 on the back of the upper slide 78 and with a corresponding rack 84 on the front of an upstanding body projection at the rear of slide 77. Movement of slide 77 either up or down effects a corresponding movement of slide 78 in the opposite direction.

Slide 77 is driven by a vertical rack 85 on its side which meshes with drive gear 86 whose shaft 87 is centrally journaled in a bearing member 88 in block 68. The end of shaft 87 opposite gear 86 has a gear 89 driven by a rack 90 disposed on a central push rod 91 which in turn is disposed axially through sleeve 69. The opposite end of push rod 91 has a flanged head 92 for confining a coil spring 93 on rod 91 biasing the same in a direction effecting closing of the fingers 65 together.

The push rod 91 is moved in opposition to spring 93 to separate fingers 65, by means of a second push rod 94 abutting the end of rod 91 and having a rack 95 thereon meshing with a gear 96 in the fixed housing 97 on base 10. The gear 96 is in turn driven by a rack 98 having a cam follower 99 on its end engaging cam 71 on shaft 12.

The cam 71 is constructed to effect separation of the fingers 65 as soon as fingers 48 leave the band 1 and before tilting of the fingers from horizontal position so that the band is tightly stretched on the fingers when the latter tilt downwardly to vertical position. In separating, the fingers 65 of the inner pairs move substantially further than those of the outer two pairs in order to provide a nearly circular shape for band 1.

The cam 71 is constructed to permit closing of the fingers 65 together by the biasing spring 93 upon the return tilting movement of the fingers so that they are closed when they reach horizontal position for receiving the next band 1 from fingers 48.

The loader block 68 is rotationally oscillated through a quarter of a revolution and back on the axis of sleeve 69 in tilting the fingers 65 from horizontal to vertical and back again. This movement of block 68 is effected by rack 100 extending horizontally through pedestal 70 and meshing with gear teeth 101 on the outside of sleeve 69.

The rack 100 is biased outwardly by a spring 102 at its rear end in pedestal 70, in a direction to maintain head 68 with fingers 65 normally horizontal.

The rack 100 is moved inwardly against spring 102 by means of a cam follower 103 on the outer end of the rack and which engages cam 73 on shaft 12.

The stripper plate 66 is mounted on the end of a push rod 104 extending through block 68 and having a rack 105 on its outer end meshing with a gear 106 on the end of a tubular shaft 107 journaled in sleeve 69 and containing axial push rod 91. The shaft 107 has a gear 108 at the end opposite gear 106, and which is driven by a rack 109 meshing with gear 108 and disposed in a slideway in housing 110 fixed to the end of sleeve 69.

Figure 1:
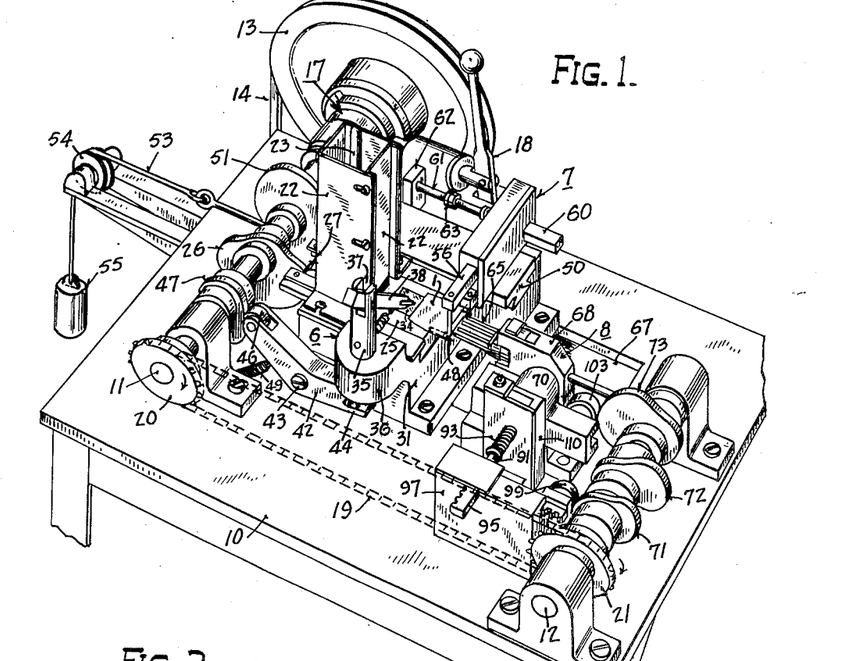
Figure 1 is a perspective view of the machine in operation.
Figure 2:
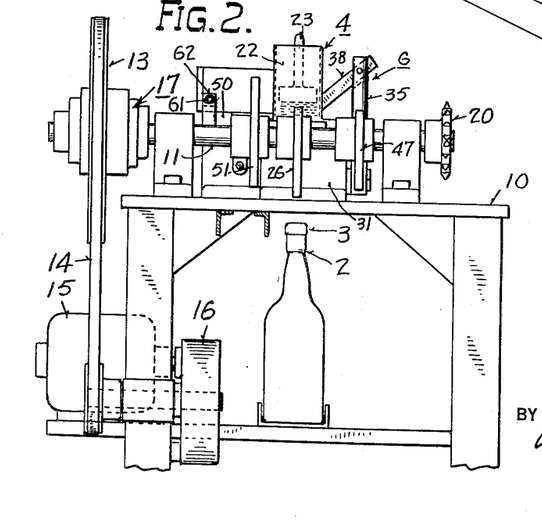
Fig. 2 is a rear end elevation of the machine.
Figure 3:
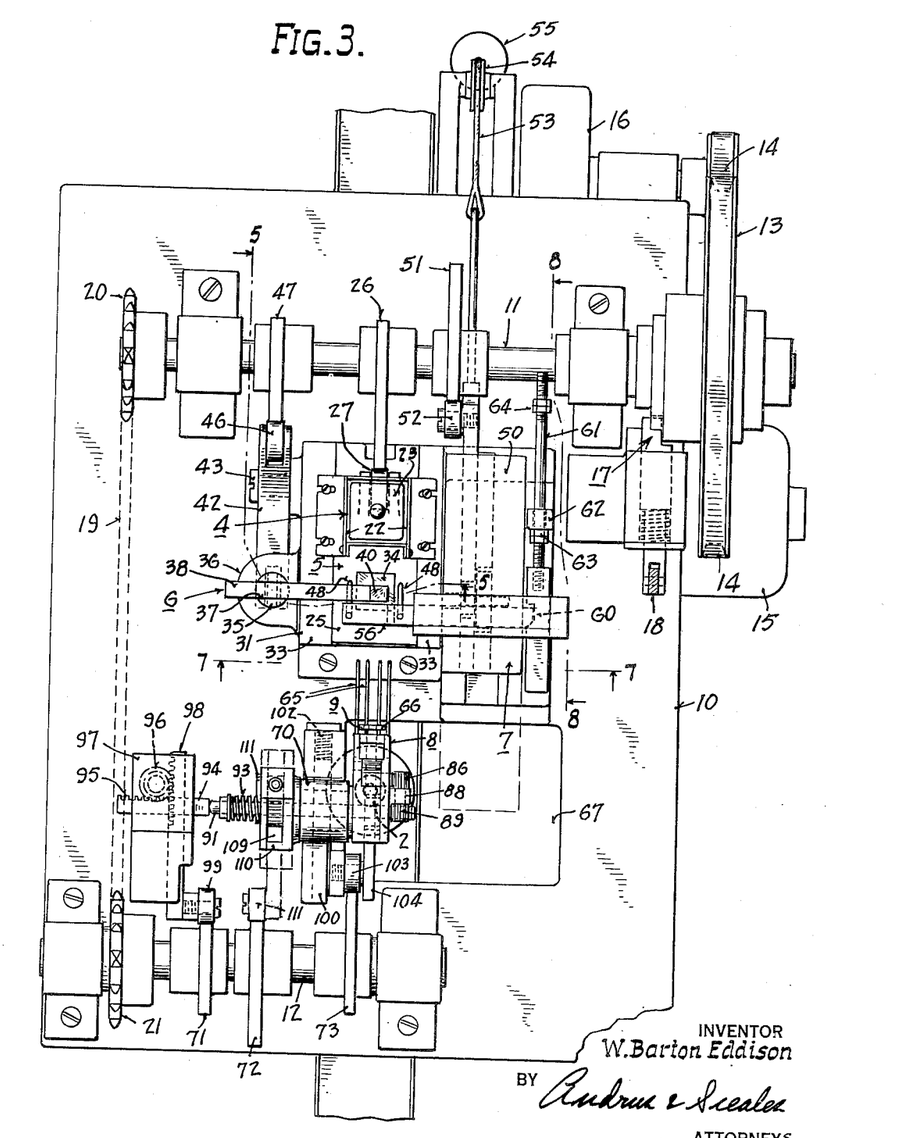
Fig. 3 is a top plan view of the machine.
Figure 4:
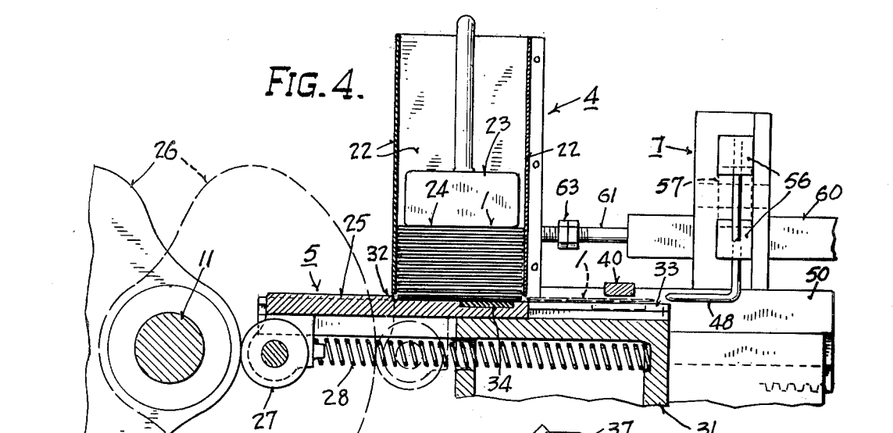
Fig. 4 is an enlarged transverse vertical section through the stack and showing the stripper in its retracted position and in dotted lines in its extended position.
Figure 5:
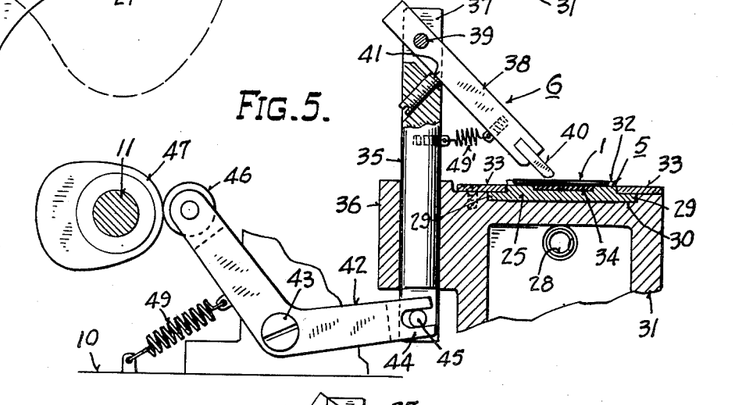
Fig. 5 is a detail vertical section taken through the opening finger and its supporting post on right angle line 5—5 of Fig. 3 showing the finger in raised position and the seal in position for opening.

When sleeve 69 rotates block 68 to present fingers 65 vertically over a bottle top 2, it likewise rotates housing 110 to present a cam follower 111 on the outer end of rack 109 to the operating cam 72 on shaft 12 as shown by dash lines in Fig. 3. Cam 72 effects inward movement of rack 109 and thereby a downward movement of stripper plate 66 along fingers 65 to push the band 1 from the fingers and onto the bottle top 2. Rack 109 is biased outwardly to normal position by means of a spring 112 disposed in housing 110.

The cam 72 effects a rapid movement of stripper plate 66 after fingers 65 locate the band 1 vertically above a bottle top 2. The cam 72 cooperates with the return rotary movement of head 68 to release cam follower 111 and let spring 112 return the stripper plate 66 to retracted position during the upward tilting of fingers 65 to horizontal position.

The invention presents a novel automatic means of breaking the vacuum between the walls of a folded seal and of initially opening the same for receiving the pick-up fingers and facilitating subsequent further opening of the seal.

Various embodiments of the invention may be employed within the scope of the following claims.

I claim:

1. In a machine of the class described for applying seals of the tubular shrink fit regenerated cellulose type to bottle tops and the like, a seal supporting member having a non-slip surface providing an opening station for a seal, a seal opening finger having a non-slip working surface, means to support said member and said finger with the working surface of said finger disposed near the center of the non-slip surface of said support member and spaced therefrom, means to position a folded flat seal upon the non-slip surface of said support member and between the same and said finger with one wall of the seal lying in engagement with said non-slip surface to prevent lateral movement of the seal in the general plane of the surface, means to relatively move said finger and member toward each other to effect engagement of the exposed wall of the seal by the non-slip working surface of said finger, said last named means effecting further relative movement between said finger and member in a direction substantially parallel to the general plane of the non-slip surface of said member to effect slippage of the exposed wall of the seal laterally relative to the opposite wall of the seal, the frictional engagement of the non-slip surfaces of said member and finger with the corresponding walls of the seal being substantially greater than the frictional engagement between the walls of the seal, said seal positioning means disposing said seal so that the closed folded edges thereof are oriented at right angles to the direction of said last named relative movement between said finger and member and said seal edges being free to move under the influence of the slippage between the walls of the seal whereby said seal walls are separated at each folded edge producing an opening extending substantially uniformly through the seal at each fold, a pair of substantially parallel pick-up fingers disposed in the general plane of the seal at the opening station with the free ends of the pick-up fingers in registry with the openings of the seal, means correlated to said relative movement means to move said pick-up fingers into the seal openings while said opening finger maintains the seal open, and means to raise said opening finger from the seal whereby the seal is free for transfer from the opening station by further movement of said pick-up fingers.

2. The machine of claim 1 in which the pair of pick-up fingers are laterally separable, and means are provided to laterally separate the pick-up fingers to stretch the seal thereon substantially simultaneously with the release of the seal by said opening finger.

3. In a machine of the class described for applying seals of the tubular shrink fit regenerated cellulose type to bottle tops and the like and having a seal opening station, means at said station to slip one wall of a flat folded seal relative to the other wall of the seal in a direction toward a folded edge thereof and with the folded edges free to move to initially open the seal and provide open separation of the walls of the seal adjacent the folded edges thereof, a pair of substantially parallel spaced pick-up fingers disposed in alignment with the corresponding seal openings, and means to move said fingers across said opening station and into the seal openings to thereby pick-up the seal and to continue the movement of said fingers to transfer the seal from said opening station.

4. The machine of claim 3 in which said pick-up fingers are laterally separable, and means are provided to laterally separate the pick-up fingers to stretch the seal thereon as the seal is transferred from the opening means.

5. The machine of claim 3 in which the pick-up fingers are constituted of L shaped members with the supporting leg of each member adapted to limit the insertion of the free leg thereof into the seal.

WILLIAM BARTON EDDISON.

References Cited in the file of this patent

UNITED STATES PATENTS

| Number | Name | Date |
| --- | --- | --- |
| 322,670 | Yates | July 21, 1885 |
| 1,835,336 | Risser | Dec. 8, 1931 |
| 2,068,107 | Nygard | Jan. 19, 1937 |
| 2,103,302 | Strout | Dec. 28, 1937 |
| 2,579,458 | Allen et al. | Dec. 25, 1951 |